United States Patent

[11] 3,614,602

| [72] | Inventor | George A. Ciotti<br>Erie, Pa. |
|---|---|---|
| [21] | Appl. No. | 785,585 |
| [22] | Filed | Dec. 20, 1968 |
| [45] | Patented | Oct. 19, 1971 |
| [73] | Assignee | A. O. Smith Corporation<br>Milwaukee, Wis. |

[54] MEASURING APPARATUS INCLUDING ROTATABLY MOUNTED APERTURED PLATE MEANS FOR MEASURING THE CHARGE IN ELECTRICALLY CHARGED FLOWING LIQUID
14 Claims, 7 Drawing Figs.

[52] U.S. Cl. ................................................. 324/32, 324/72
[51] Int. Cl. ................................................. G01r 29/12, G01r 5/28
[50] Field of Search ................................. 324/32, 72, 61 LP, 109; 317/2

[56] References Cited
UNITED STATES PATENTS

| 2,032,932 | 3/1936 | Hauffe et al. | 324/109 |
| 2,815,483 | 12/1957 | Kaufman | 324/72 |
| 2,848,667 | 8/1958 | Rolfe | 324/61 LP |
| 3,141,113 | 7/1964 | Munday et al. | 317/2 |
| 3,184,967 | 5/1965 | Rogers | 324/32 UX |
| 3,306,320 | 2/1967 | Bond | 324/32 X |
| 3,314,005 | 4/1967 | Whitener | 324/61 LP |
| 3,478,261 | 11/1969 | Forster et al. | 324/32 |

OTHER REFERENCES

Application Ser. No. 480,269 (abandoned) filed 8/17/65, 6 pp. of specification, 1 sheet of drawing Schuringa et al., " Measurement of Space Density of Charge in Flowing Liquids," Journal of Scientific Instruments, Vol. 37, Sept. 1960, pp. 332– 335

*Primary Examiner*—Gerard R. Strecker
*Attorney*—Andrus, Sceales, Starke & Sawall ABSTRACT: The present disclosure relates to an apparatus for measuring the charge in a flowing liquid. A pair of apertured metal discs are coaxially mounted adjacent to the peripheral portion of the main liquid stream. One disc is driven from a synchronous motor to provide an electrostatic charge-sensing device. The motor contained in an explosion proof housing, is releasably coupled to the disc assembly and includes a switch housing. A reed switch is disposed within the switch housing with an actuating permanent magnet axially spaced from the switch. A shutter is interconnected to the motor-driven shaft and extends between the switch and the magnet. The configuration of the shutter corresponds to an apertured disc. The reed switch connects the discs in an output circuit.

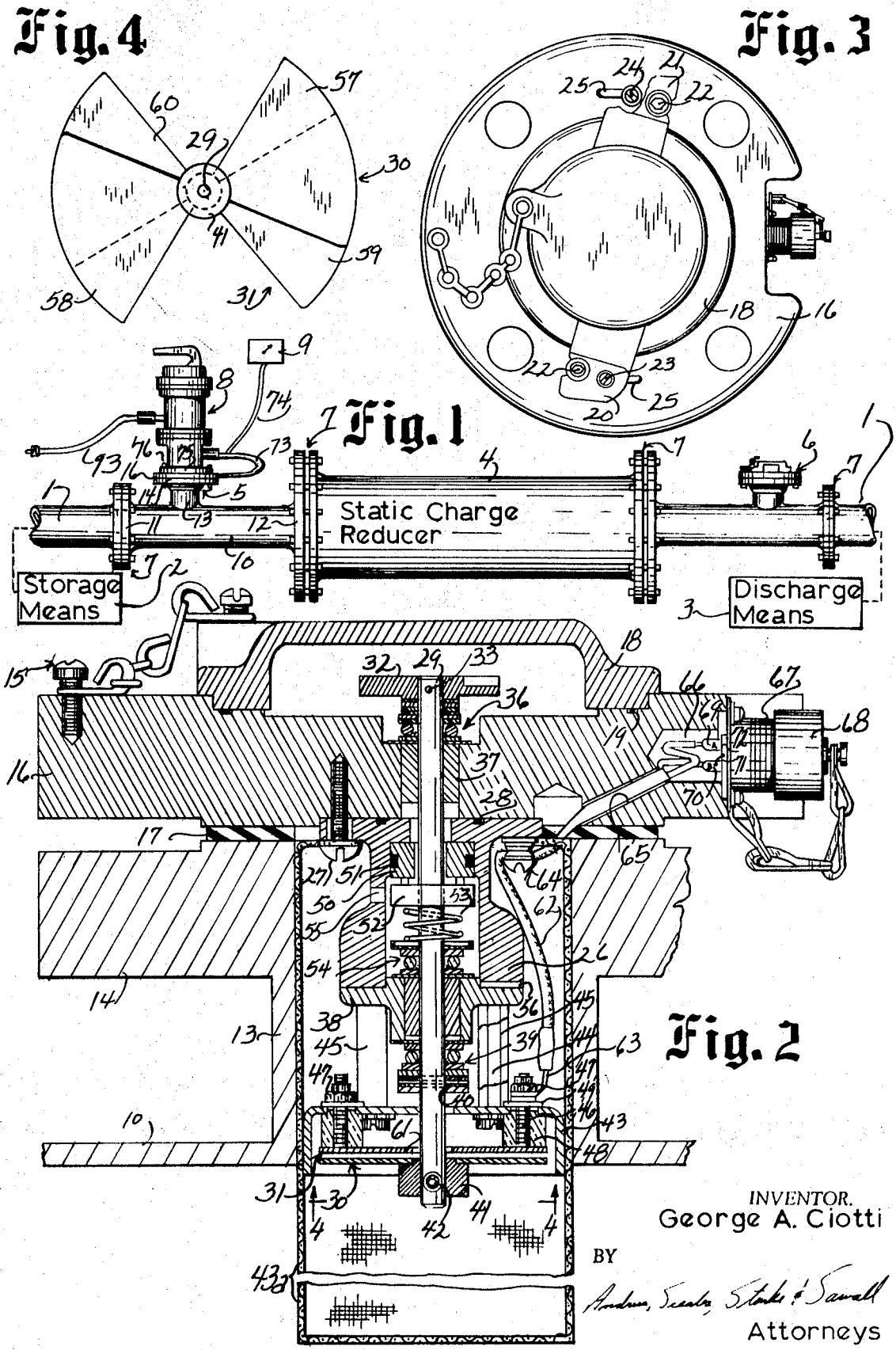

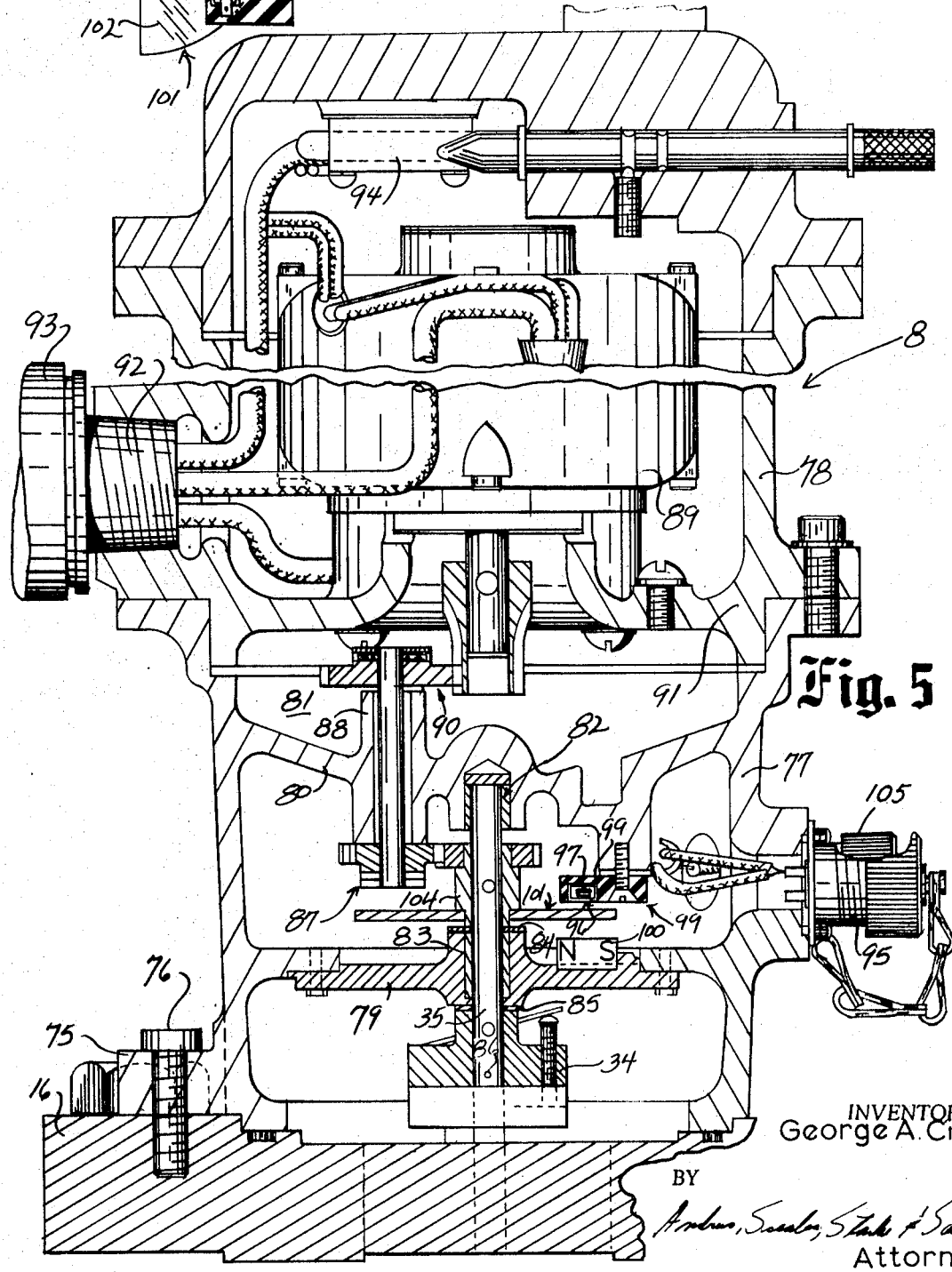

MEASURING APPARATUS INCLUDING ROTATABLY MOUNTED APERTURED PLATE MEANS FOR MEASURING THE CHARGE IN ELECTRICALLY CHARGED FLOWING LIQUID

This invention relates to a charge density measuring apparatus for detecting and measuring the charge level in an electrically charged flowing liquid such as hydrocarbon petroleum products.

In the distribution of petroleum products, bulk storage plants are normally employed to hold the products for subsequent distribution to retail stations throughout the marketing areas. The stored products are transferred through suitable liquid flow conduits or pipes at relatively high rates of discharge. The flow of liquid such as hydrocarbon which generally have a relatively low conductivity through a metal pipe or the like can generate electric charges within the fluid. Generally, it would appear that the absorption of ions of a given polarity to the surface of the pipe results in a net charge within the fluid as a result of the retained mobile ions which are carried along by the fluid. In hydrocarbon liquids, the charge can accumulate to a level sufficient to cause an electrical breakdown between the charges in the form of a spark. This presents the possibility of ignition of combustible vapors with resulting fires, explosions and the like. Charge reduction means may be connected in the flow line to eliminate the accumulated charges and to maintain the charge in the fluid below a dangerous level. It is necessary, however, to periodically check the operation of the reducing means to insure safe, reliably operation of the flow system.

Although various systems have been suggested for determining or checking the charge in a flowing fluid, generally they have been relatively complicated and expensive units. So far as applicant had been able to determine, the prior art measuring apparatus has not produced the desired sensitivity and stability for reliable measuring of the charge density of the liquid. Additionally, the calibration of devices to a charge level range has not been sufficiently small to provide reliable detection of the charge density.

The present invention is particularly directed to an improved charge density measuring apparatus for detecting and/or measuring the charge in a flowing liquid. Generally, the apparatus of the present invention employs a pickup sensor and an aligned shield, preferably in the form of planar plates. The plates are mounted immediately adjacent to the peripheral portion of the main liquid stream and one of the plates is driven with respect to the other to provide an electrostatic charge sensing device. This position of the plates adjacent to the peripheral flow area of the liquid essentially eliminates any interference with the flow or creation of any turbulence within the flow pipe to insure an accurate electrostatic pickup of the charge. The sensor or pickup plate is periodically exposed to the liquid and is charged in accordance with the charge density of the flowing liquid.

The driven plate is preferably rotated at a constant speed through an external drive mechanism. Consequently, it is only driven when it is desired to obtain a readout. This permits maximum operating life.

In accordance with a preferred and novel construction of the present invention, the sensing head, including a rotor plate and a stator plate, are coaxially mounted as a permanent portion of the flow system.

The rotor and stator each include a plurality of opposed pie-shaped quarter sections interconnected at the apex such that the rotation of the apertured rotor alternately exposes and covers the corresponding plate sections of the apertured stator. A perforated grounded cup member is secured over the stator and rotor and projects into the stream to define a charge isolating pickup chamber. The stator is preferably formed as the pickup plate and the rotor as an insulating shield. The stator plate is connected to the meter to produce a readout of the charge density. A switch means actuated in synchronism with the rotor is interconnected in circuit with the stator plate and the meter to eliminate the charge during portion of the cycle and to thereby drive the meter with a single polarity. As applied to a petroleum flow system, the sensor assembly, including the stator and rotor, are mounted within a pipe stub extending normal to the main flow line.

The mounting of the sensor head in the pipe stub at right angles to the main piping essentially completely removes the sensing mechanism form the flow stream. It therefore produces virtually no pressure drop or turbulence of the liquid. A releasable cover of the sensor assembly encloses a coupling means. The sensor assembly also includes a releasable electrical connector connected to the pickup plate. A portable explosionproof motor drive includes a quick disconnect coupling means for interconnection to the coupling means of the sensor assembly. The motor assembly includes a switch housing through which the drive motor shaft is connected by a suitable gear train to the coupling means. A magnetically actuated switch is disposed within the switch housing with a control or actuating magnet axially spaced from the switch. A shutter is interconnected to the shaft and extends between the magnetically actuated switch and the actuating magnet. The configuration of the shutter corresponds to the rotor plate and moves between the switch and the magnet to provide a synchronous operation of the switch. This switch is connected to a suitable cable connector which is connected to the pickup plate connector of the sensor assembly. A portable meter includes a connector for connection to the electrical connector of the switch housing. The switch rectifies the charge density signal by shunting to ground that part of the signal which is to be ignored or eliminated.

The drawings furnished herewith illustrate the best mode presently contemplated by the inventor for carrying out the present invention and clearly disclose the above advantages and features as well as others which will be readily understood from the following description of the illustrated embodiment.

In the drawings:

FIG. 1 is a side elevational view of a petroleum flow system incorporating the subject matter of the present invention;

FIG. 2 is an enlarged vertical section through the charged density measuring or sensing apparatus shown in FIG. 1;

FIG. 3 is a top view of the sensor assembly shown in FIG. 2;

FIG. 4 is a fragmentary sectional view taken generally along lines 4—4 of FIG. 2 showing the rotor and stator plate construction of the illustrated embodiment of the invention;

FIG. 5 is an enlarged vertical section through the sensor drive assembly shown in FIG. 1.

FIG. 6 is a fragmentary sectional view taken generally on line 6—6 of FIG. 5 illustrating a switch control; and FIG. 7 is a schematic circuit diagram illustrating a preferred meter circuit connection.

Referring to the drawing and particularly to FIGS. 1 and 2, the illustrated embodiment of the invention is shown applied to a liquid flow line 1 which interconnects a bulk storage tank 2 to a suitable discharge means 3. The storage tank 2 may store any suitable petroleum product or the like which is adapted to be discharged through the discharge means 3 at a relatively high rate of discharge. A static charge reducer 4 is inserted directly in the flow line 1 and forms a part thereof. A charge sensor housing and head assembly 5 is mounted immediately adjacent the upstream side of the reducer 4 and a corresponding sensor and head assembly 6 is mounted immediately adjacent the downstream side of the reducer. The reducer 4 and the sensor housing and head assemblies 5 and 6 each include outer flow pipe members which are interconnected and coupled to each other by a plurality of similar interconnecting bolted flange assemblies 7 to form a continuous part of flow line 1. Thus, the liquid flowing from the storage tank to the discharge means 3 flows serially through the sensor housing and head assembly 5, the static charge reducer 4 and the sensor housing and head assembly 6. The static charge reducer 4 may be of any desired or known construction which functions to reduce accumulated charge in the flowing liquid. Consequently, no further description thereof is given.

The sensor housing and head assemblies 5 and 6 are motor driven units constructed in accordance with a preferred embodiment as more fully developed hereinafter. A releasable sensor drive assembly 8 is shown mounted and coupled to the sensor housing and head assembly 5. It is adapted to drive the sensor housing and head assembly 5 which produces an electrical output related to the charge density of the flowing liquid. The output is coupled to an electrometer 9 for readout of the actual charge density.

In operation, when it is determined to check the functioning of the static charge reducer 4, the sensor drive assembly 8 is sequentially coupled to the sensor housing and head assemblies 5 and 6. Readings are obtained of the accumulated charge in the liquid at the inlet and outlet of the reducer 4. A comparison of the readings provides a direct indication of the effectiveness of the reducer 4 and the charge in the liquid.

The sensor housing and head assemblies 5 and 6 are identically constructed and consequently the assembly 5 is shown and described in detail with the corresponding elements of the sensor housing and head assembly 6 identified by corresponding primed numbers.

Referring particularly to FIG. 2, the sensor housing assembly 5 includes a flow pipe 10 having generally the same diameter as the flow line 1 and end flanges 11 and 12 forming a part of the bolted flange units or assemblies 7. A pipe stub 13 is secured to the central portion of the pipe 10 and extends downwardly perpendicularly therefrom and in a mounting flange 14 for a sensor head assembly 15. A mounting plate 16 forming a part of the housing of sensor head assembly 15 is bolted to the flange 14 with a suitable sealing gasket 17 disposed therebetween. A releasable cup-shaped cover 18 closes the top wall of the sensor head housing when the drive assembly 8 is removed. The cover 18 is a twist-type cover having an O-ring seal 19 interposed between the underside of the cover and the adjacent portion of the flange. Diametrically located and similarly constructed slotted locking lips 20 and 21 are integrally formed on the cover 18. The edges of the lips 20 and 21 are recessed such that twisting of the cover moves the lips into and from locking engagement with a pair of diametrically disposed locking bolts 22. The cover is sealed in place by a pair of similar locking screws 23 which are adapted to be turned downwardly through the lip into the locking engagement with a suitable locating and locking member 24 provided in the corresponding portion of the cover, as shown in the upper portion of FIG. 3 at the broken away portion of the cover 18.

A laterally extending groove 25 extends from the locking member 24 in the top surface of the mounting plate and outwardly beyond the cover lip.

A bearing hub 26 is secured by a plurality of attaching screws 27 to the underside of the mounting plate 16. An O-ring seal 28 is disposed between the underside of the plate and the adjacent surface of the hub to prevent flow of fluid from within the stub pipe 13 between the mating surfaces and into the head assembly 15.

A rotor drive shaft 29 is journaled within the hub 26 and extends downward with the lower end interconnected to a grounded shield plate 30, constituting the rotor of the sensor assembly. The plate 30 is located immediately beneath a signal or charge pickup plate 31 which constitutes the stator of the sensor assembly. The plate 31 is interconnected to the meter 9 to provide a reading of the charge density in the flowing liquid, as more fully developed hereinafter.

The upper end of the shaft 29 terminates immediately beneath the releasable cover 18. A coupling member 32 is pinned to the outermost end of the shaft 29 as by a pin 33 and adapted to be releasably coupled with a corresponding mating coupling member 34 which is similarly secured to a motor-driven shaft 35 forming a part of the releasable sensor drive assembly 8 as shown in FIG. 5. A thrust bearing assembly 36 is interposed between the underside of the coupling member 32 and the upper wall of the mounting plate 16 to support the shaft 29 and coupling member 34 on the plate 16. The mounting plate 16 is also provided with a radial bearing 37 within a suitable opening immediately adjacent to the thrust bearing 36 to support the upper end of the shaft 29 which extends downwardly through the hub 26. The lower end of the lug 26 is closed by a bearing cap 38 having a radial bearing through which the shaft projects. A thrust bearing unit 39 is pinned to the shaft as at 40 and bears on the adjacent end of the bearing cap 38 to support the rotating plate assembly and shaft against upward thrust forces.

The lower end of the shaft 29 extends downwardly from the hub and cap assembly. The rotor plate 30 is secured to a hub 41 which is in turn secured to the lowermost end of the shaft 29 by a suitable set screw 42 or the like.

The stator plate 31 is supported within an inverted cup-shaped support cap 43 which is interconnected by a plurality of circumferentially distributed attachment bolts 44 to the bearing hub 26. The inverted support cap 43 is spaced downwardly by suitable spacers 45 encircling the attachment bolts 44.

The pickup or stator plate 31 is disposed within the cap 43 with attachment or clamping bolts 46 projecting upwardly therefrom through suitable openings in the base of the cap. Clamping nuts 47 threaded onto the upper end of the bolts and insulating spacers 48 encircle each of the bolts between the back side of the plate and the base of the cap 43 to properly locate the pickup plate 31 with respect to the plate 30. Insulating washers 49 are disposed between the clamping nuts 47 and the exterior of the cap 43 to electrically isolate and insulate the pickup plate 31 from the sensor head assembly.

The cap 43 projects downwardly with the lower edge disposed slightly below the plane of the rotor plate 30. Further, with the assembly mounted within the stub pipe 13, the lower edge of the cap 43 is disposed just beneath the peripheral edge portion of the pipe 10 such that the rotor plate 30 is generally in the plane of the flow pipe.

A cup-shaped cylindrical enclosure 43a is formed with or connected to the cap 43 as shown in FIG. 2 and projects axially therefrom into the stream conduit means or line, and the enclosure 43a is formed of a metal screening or other highly perforated metal to permit essentially unrestricted flow. The enclosure 43a is electrically at ground through the grounded cap 43 and functions to define a selected charge sensing chamber. This has been found desirable for eliminating the effect of the size of the conducting pipe or line to insure accurate detecting of the charge.

In the illustrated embodiment of the invention, the hub 26 is sealed to prevent escape of liquid or vapor upwardly along shaft 29, as follows. An insulating and seal member 50 is provided within the upper portion of the hub and sealed to the interior surface of the hub by seal 51. A rotating seal member 52 is located immediately below member 50 and held in raised position by a coil spring 53 which encircles the shaft immediately below the member 52. The lower end of the coil spring is held by a retainer cap on a thrust bearing assembly 54 which rests upon the upper end of the radial bearing cap. A lateral opening 55 is provided in the upper portion of the bearing hub immediately below the sealed member 50 or adjacent to seal member 52. A similar lateral opening 56 is provided on the opposite side of the hub adjacent the lower thrust bearing 54. This permits the liquid to flow through the assembly or the hub assembly. The seal members 50 and 52, however, prevent escape of the liquid outwardly through the assembly and into the area of the coupling. The sensor head assembly provides a mounting of the plates 30 and 31 within the outer boundary area of the flowing liquid and seals the stub pipe.

As most clearly shown in FIG. 4, the rotor plate 30 includes a pair of pie-shaped quarter sections 57 and 58 joined at the apex to each other and to the hub 41 of shaft 29. The plate 31 includes quarter sections 59 and 60 joined at the apex and extending in diametrically opposite directions therefrom. The apex connection is apertured as at 61 as most clearly shown in FIG. 2, to allow the shaft 29 to project freely therethrough. A pickup lead 62 includes a connector 63 clamped between the nut 47 and washer 49 and thus electrically connected to the plate 31. The lead 62 fits through a wire clamp 64 attached by a suitable screw to the underside of the bearing hub 26. Lead 62 extends therefrom through a lateral inclined opening 65 in the mounting plate. The outer end of the lead terminates within a terminal opening 66. The outer edge of the mounting plate 16 is slotted adjacent the opening and a weatherproof receptacle 67 is bolted within the opening. The receptacle 67 includes a weatherproof threaded cap 68. The signal lead 62 is soldered to a signal lead terminal 69 within the recess. A ground terminal is soldered or otherwise secured by ground lead 71 to rim 72 of the receptacle 67.

As shown in FIG. 1, an electrical cable 73 is adapted to mate with the receptacle 67 and provide a connection through the assembly 8 to a meter cord 74 for energizing meter 9 in accordance with the output of the stator plate 31 which results from the rotation of the rotor plate 30 by the sensor drive assembly 8.

Referring particularly to FIG. 5, the sensor drive assembly 8 includes a lower mounting flange 75 releasably interconnected to the plate of the sensor assembly by a plurality of bolts 76 or the like. A gear and switch housing 77 is mounted on the flange and projects vertically therefrom with a motor housing 78 secured in stacked relation to the housing 77.

The gear and switch housing 77 is generally a tubular member having a bottom wall 79 attached to an adjacent flange of housing 77 and an integral top wall 80 defining an explosionproof chamber 81. The motor driven shaft 35 is disposed within the chamber with the upper end journaled within a recess in a central portion of a top wall 80 as at 82. Shaft 35 extends downwardly through a radial bearing 83 with the outer end terminating below the wall 79 and within the lower portion of housing 77. End spacing washers 84 and 85 are secured to the shaft and bear on adjacent portion of the bearing hub of the bottom wall.

The coupling member 34 is secured to the lower end of the shaft 35 as by a connecting pin 86 and provides a releasable coupling to the member 32 of the sensor head shaft 29, as previously described.

A gear train 87 within the housing is coupled to the shaft 35 with an output shaft extending upwardly through a bearing hub 88 which is a flame path barrier in the integral upper wall 80 for explosionproof chamber 81 and connected to the shaft of a motor 89 by suitable gears 90.

The motor 89 is preferably a synchronous constant speed motor mounted within the motor housing 78 on an integral mounting wall 91. A sealed cable connector 92 is provided in the one adjacent wall and is adapted to receive an electrical power cable 93 for energization of the motor. A sealed on-off switch 94, shown in the cover of the housing 78, is suitably interconnected into the energizing circuit to provide selective energization of the motor 89 during mounting and demounting of the drive assembly 8 with respect to the sensor head assembly 5 or 6.

A signal connector 95 is provided in the wall of the switch housing 77 to permit interconnection of the plate lead cable 73 to the meter through a controlled switching system including a reed switch 96 mounted within the housing 77. The reed switch 96, as most clearly shown in FIG. 6, is of the well known variety having a pair of oppositely extending leaf contacts 97 with the adjacent ends disposed in overlapping engagement. The contacts are mounted within a sealed glass tubular housing 98 which is secured to the underside of the top wall of the housing by a suitable mounting bracket 99. An operating magnet 100 is secured to the bottom wall 79 of the housing 77 in alignment with the reed switch 96. The magnetic field of the magnet 100 is effective to close the contacts 97. A shutter 101 is secured to the shaft 35 within the switch housing. The shutter generally corresponds to the configuration of the rotor with quarter sections 102 and 103 interconnected at the apex and extending in opposite directions therefrom. The shutter 101 is secured to a hub 104 of the gear train 87 to rotate in synchronism with the shaft and therefore in synchronism with the rotating rotor plate 30. The shutter 101 is mounted in preselected alignment with the rotor and provides a synchronized operation of the switch 96 which restricts the signal transfer to the maximum output signal. As the shutter 101 moves between the magnet 100 and the reed switch 96, it essentially decouples the magnet from the reed switch and causes the reed switch to revert to the normally open position.

The connector 95 is connected internally of the housing 77 to a similar offset meter cable connector 105 which is partially shown in FIG. 5, and provides for interconnection of the input cable 74 of the electrometer 9 and the plate-connecting cable 73 through the switch 96, as shown in FIG. 7.

The electrometer 9 is preferably a portable battery-operated electrometer which is adapted to be releasably connected into the system by the cable 74. Further, a single meter 9 is preferably employed to service a number of sensor assemblies.

The operation of the illustrated embodiment of the invention can be briefly summarized as follows. The flow system is constructed as shown in FIG. 1 with sensor head and housing assemblies 5 and 6 permanently mounted to the opposite sides of the static charge reducer 4. A portable drive assembly 8 and a portable electrometer 9 are employed to service any number of similar systems having corresponding sensor heads connected therein. As the drive assembly 8 and the meter 9 are relatively expensive components, their construction minimizes the total cost of the detection and measuring system.

The sensor assembly is mounted in the pipe stub 13 at right angles to the main pipe 10 and in such a manner as to locate the rotor plate essentially completely removed from the flow stream with only the highly perforated enclosure 43a extending into the stream such that the sensing head assembly introduces a minimal pressure drop into the system.

Assuming a positively charge liquid flows through the assembly, the enclosure 43a will by induction be negatively charged as will the plate 31. The total positive charge affecting the plate 31 is the positive charge within the negatively charged screen member 43a which constitutes an effective shield means. The single assembly may therefore be employed with different sized lines. For example, a single assembly has been provided for 3, 4, and 6-inch piping.

Further, when the rotor 30 is driven, the rotation will not produce any appreciable turbulence in the liquid and consequently insure more accurate measurement of the charge.

When it is desired to take a reading, the twist cover 18 is released and rotated and lifted from the mounting plate 16. The motor drive assembly 8 is releasably interconnected to the mounting plate 15 of the sensor with the coupling members 32 and 34 automatically interconnected to couple the motor driven shaft 35 to the sensor head shaft 29. The on-off motor switch 94 is then actuated to energize the motor 89 which will simultaneously drive the shutter 101 and the rotor 30 of the sensing head. The rotation of the rotor 30 results in the generation of an output charge on the stator plate 31 which is transferred to the meter 9 and provides an output directly proportional to the actual charge density in the flowing liquid. The reed switch 96 is opened and closed in synchronism with the movement of the rotor 30 past the stator or pickup plate 31 to establish transfer of a maximum or peak rectified signal to the meter 9.

FIG. 7 is a schematic circuit diagram illustrating the circuit connection between the pickup plate 31 and the meter 9. As shown, the pickup plate 31 is interconnected to the one side of the meter 9. The other side of the meter is grounded by the ground lead 71 within receptacle 67 of the sensor head 5.

The reed switch 96 is connected in parallel with the electrometer input. Consequently, when the switch 96 is closed, the electrometer is shunted to ground. This is established when the shutter 101 moves to expose the reed switch 96 to the magnet 100. The reed switch 96 opens when more than 50 percent of the pickup plate is exposed to the liquid such that the plate rapidly picks up a charge. As the insulated rotor 30 moves in alignment with the stator 31, the charge is applied to the meter 9 and provides a signal proportional to the actual charge density.

The readout is taken at both sensor assemblies 5 and 6 to the opposite sides of the static charge reducer 4. The signal amplitude of the electrometer 9 is directly convertible to a charge density reading in microcoulombs per cubic meter on an appropriately marked meter scale or from an appropriate calibration chart. This then provides a very simple and reliable means for detecting and measuring the charge density of the liquid and more particularly the effectiveness of the charge reducer 4.

Although the rotor and stator have been illustrated as including opposed pie-shaped segments, they may of course be formed with a greater or lesser number of segments and with other configurations than pie-shaped segments.

The system only requires the pickup plate be alternately exposed and shielded from the flowing liquid. Further, the stator can be formed as a fixed outer shield member with a pickup rotor mounted to the opposite side of the shield. The pickup stator construction is preferred to minimize the connection complications involved with an output connection to a rotation member.

The present invention thus provides a relatively simple electromechanical device for accurately and reliably determining the level of the charged density in a flowing liquid such as a hydrocarbon or petroleum liquid.

Various modes of carrying out the invention are contemplated as being within the scope of the following claims particularly pointing out and distinctly claiming the subject matter which is required as the invention.

I claim:

1. A charge density detection apparatus for determining the charge density in a liquid flowing through a conduit means, comprising
 a support means having attachment means for securing the support means to the conduit means,
 first and second similar apertured plate members coaxially mounted on said support means in insulated relationship from each other and located adjacent to the peripheral flow area of said liquid with the axis of rotation substantially perpendicular to the direction of flow of the liquid and with the support means secured to the conduit means, a drive shaft included in said support means, means to connect said first plate to said drive shaft,
 said first and second plate members having alternate openings equicircumferentially spaced about said drive shaft,
 a cup-shaped housing secured to said support means and having sidewalls extending over and terminating immediately outwardly of said first and second plate members,
 means to secure said second plate member to said cup-shaped housing, and
 drive coupling means on the drive shaft to rotate the first plate member relative to the second plate member.

2. The charge density detection apparatus of claim 1 wherein said conduit means includes a main flow line and a normal pipe stub projecting outwardly from said main flow line, said support means include a mounting plate adapted to be releasably connected to said pipe stub,
 said support means includes a shaft rotatably mounted in said mounting plate with said first plate member connected to said shaft,
 means to rotatably seal said shaft to said mounting plate, and
 means to mount said second plate member to said mounting plate with said first and second plates essentially aligned with the inner surface of said main flow line.

3. The charge density detection apparatus of claim 2 wherein said mounting means includes an inverted cup-shaped housing secured to said mounting plate and extending over said first and second plate members and having an outer open edge disposed outwardly of said first and second plate members.

4. The charge density detection apparatus of claim 2 wherein said shaft terminates in an outer drive coupling, a drive motor terminating in a complementing drive coupling for said outer drive coupling, and means to releasably connect the drive motor to said mounting plate.

5. The charge density detection apparatus of claim 4 having an explosion enclosure secured to said motor, said motor having a shaft means extending through the enclosure, a switch means connected in said electrical circuit and disposed within the enclosure and periodically actuated by the shaft means for selectively connecting said plate members into said electrical circuitry, and releasable connector means to connect the switch means in circuit with said plate members.

6. The charge density detection apparatus of claim 1 wherein said support means includes a top mounting plate adapted to be secured to the conduit means and having an inner bearing hub, a shaft rotatably mounted in the plate and hub, means to secure said first apertured plate member to the inner end of the shaft, a cup-shaped housing having its base secured to the hub and projecting inwardly over said first and second plate members with the edge of the cup-shaped housing disposed immediately outwardly of said apertured plate members, insulating means to secure said second apertured plate member to the base of the housing between said base and said first apertured plate member, electrical connecting means connected to said second aperture plate member and terminating in an outer releasable connector in the mounting plate.

7. The charge density detection and measuring apparatus of claim 1 having switch means connected in said electrical circuit to periodically close and open said electrical circuit, and means connected to said first and second plate members to actuate said switch means in synchronism with the relative rotation of said first plate member with respect to said second plate member.

8. The charge density detection and measuring apparatus of claim 1, having a switch housing connected to said support means, an enclosed magnetically responsive switch means connected to said switch housing and connected to periodically open and close said electrical circuit, a magnet connected to said switch housing and disposed in spaced operating relationship to said switch means, and a shutter means connected in rotative relationship to said switch housing and having alternate openings continuous equicircumferentially spaced corresponding to said apertured plates and rotated in synchronism with the rotation of said first plate member with the peripheral portion passing between said switch means and said magnet.

9. The charge density detection apparatus of claim 1, wherein said first platelike member is secured to a shaft rotatively mounted in said support means, a drive coupling means connected to said shaft, a drive means having an output shaft and a coupling means for releasable coupling to said drive coupling means for interconnecting said shafts, switch means to periodically disconnect and connect said second platelike member in said circuit, means to mount said switch means in said drive means, a magnet for said switch means, and a shutter means connected to said output shaft to actuate said switch in synchronism with the rotation of said output shaft and said first platelike member.

10. The charge density detection apparatus of claim 1, wherein said support means includes a drive shaft rotatively mounted therein and connected to said first plate member, a housing connected to said support means, a drive motor connected to said housing, a rotatable shaft means connected to said drive motor and mounted in said housing and extending therethrough, an outer drive coupling means connected to said shaft means and adaptable to be coupled to said drive shaft to rotate said first plate member, a switch enclosure within said housing having an outer releasable connector means, a switch means mounted within said enclosure and connected to said connector means, and actuating means coupled to said shaft means to actuate the switch means in synchronism with the rotation of the shaft means.

11. The charge density apparatus of claim 10, wherein said switch means includes a magnetically responsive switch and a biasing magnetic means mounted in spaced coupled relationship to the switch, and said actuating means includes an apertured shutter means having alternate openings continuous equicircumferentially spaced corresponding to said first plate member and rotating in synchronism therewith between said switch and said magnetic means to selectively connect said plate members into said electrical circuit to supply a signal corresponding to the charge density in the flowing liquid.

12. The charge density detection apparatus of claim 1 including an inverted cup-shaped metallic housing secured to and extending over said plates into the conduit means, a perforated cup-shaped shield member connected to and extending from said cup-shaped housing into said conduit means to define a selected sensing chamber.

13. A system for measuring the charge density in a flowing liquid, comprising
- a pair of charge-sensing assemblies, each having a flow conduit member and an outwardly projected chamber member connected to one side of said conduit member, each of said sensing assemblies including a first and second apertured plate coaxially mounted immediately adjacent the connection of said chamber member and the conduit member and having said first plate rotatably relative to said second plate to periodically subject the second plate to the flowing liquid and having a releasable coupling member connected to said first plate,
- a charge-reducing means including a flow conduit member connected between said flow conduit members of the charge-sensing assemblies,
- a drive motor unit having means to selectively releasably mount the unit upon a selected said chamber member and having a coupling member releasably coupled to said first coupling member, and
- means to electrically connect said plate members in an electrical circuit to detect the charge density in the flowing liquid.

14. The system for measuring the charge density in a flowing liquid of claim 13, wherein said flow conduit member is a tubular pipe and said outwardly projected chamber member is a pipe stub to the one side of said tubular pipe, a plate support releasably connected to the pipe stub, a shaft journaled in the support, said first plate of the pair of apertured plates being connected to the inner end of said shaft, said second plate being connected to said support, and said shaft being constructed to locate said plates in the boundary liquid in said tubular pipe.